United States Patent
Lazar et al.

(10) Patent No.: US 10,146,236 B2
(45) Date of Patent: Dec. 4, 2018

(54) TWO CONDUCTOR WIRELINE GUIDED CONTROL AND AN HVAC SYSTEM EMPLOYING THE SAME

(71) Applicant: Lennox Industries Inc., Richardson, TX (US)

(72) Inventors: Steve Lazar, San Antonio, TX (US); Jayprakash Charavda, Irving, TX (US)

(73) Assignee: Lennox Industries Inc., Richardson, TX (US)

( * ) Notice: Subject to any disclaimer, the term of this patent is extended or adjusted under 35 U.S.C. 154(b) by 223 days.

(21) Appl. No.: 14/933,248

(22) Filed: Nov. 5, 2015

(65) Prior Publication Data

US 2016/0202711 A1 Jul. 14, 2016

Related U.S. Application Data

(60) Provisional application No. 62/101,575, filed on Jan. 9, 2015.

(51) Int. Cl.
| | | |
|---|---|---|
| *G05D 23/00* | (2006.01) | |
| *G05D 23/19* | (2006.01) | |
| *F24F 11/30* | (2018.01) | |
| *F24F 11/62* | (2018.01) | |
| *F24F 11/54* | (2018.01) | |

(52) U.S. Cl.
CPC .............. *G05D 23/19* (2013.01); *F24F 11/30* (2018.01); *F24F 11/62* (2018.01); *F24F 11/54* (2018.01)

(58) Field of Classification Search
CPC .. G05D 23/19; F24F 11/006; F24F 2011/0067
See application file for complete search history.

(56) References Cited

U.S. PATENT DOCUMENTS

| | | | | |
|---|---|---|---|---|
| 5,289,362 | A * | 2/1994 | Liebl .................. | G05D 23/1923 165/268 |
| 2004/0220700 | A1* | 11/2004 | Schroeder .......... | G05D 23/1902 700/276 |
| 2005/0078700 | A1* | 4/2005 | Thompson .............. | H04L 12/10 370/463 |
| 2011/0118896 | A1* | 5/2011 | Holloway ............ | F24F 11/0086 700/300 |
| 2012/0158932 | A1* | 6/2012 | Grohman ................ | H04L 67/02 709/223 |
| 2013/0126625 | A1* | 5/2013 | Groskreutz ............... | F24F 1/44 237/8 A |
| 2013/0253708 | A1* | 9/2013 | Lafleur .............. | G05D 23/1923 700/276 |

* cited by examiner

Primary Examiner — Larry Furdge
(74) Attorney, Agent, or Firm — Winstead PC (57) ABSTRACT

A heating, ventilation, and air conditioning (HVAC) system includes a control unit, a central controller coupled to the control unit via a first two-conductor wireline structure, and a plurality of HVAC system components coupled to the central controller via a second two-conductor wireline structure. The central controller is configured to receive, via the first two-conductor wireline structure, control information corresponding to an enclosed space, generate control data, and transmit, via the first two-conductor wireline structure, the control data to at least one of the plurality of HVAC system components to regulate operations thereof.

20 Claims, 5 Drawing Sheets

“TWO CONDUCTOR WIRELINE GUIDED CONTROL AND AN HVAC SYSTEM EMPLOYING THE SAME”

CROSS-REFERENCE TO RELATED APPLICATIONS

This Application claims the benefit of U.S. Provisional Application 62/101,575 filed on Jan. 9, 2015. U.S. Provisional Application 62/101,575 is incorporated herein by reference.

TECHNICAL FIELD

The present invention relates generally to heating, ventilation, and air conditioning (HVAC) systems and, more particularly, but not by way of limitation, to electronic equipment control and communication between equipment in the HVAC system.

HISTORY OF RELATED ART

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying, or dehumidifying the air).

Some HVAC systems use four conductive wires, such as copper wires, for communicating control information. For example, HVAC systems with communicating controllers (e.g., thermostats) provide additional information beyond just on-off control signals and currently require the four wire control wiring. Using four wires for control wiring results in cost increase.

BRIEF SUMMARY OF THE INVENTION

A heating, ventilation, and air conditioning (HVAC) system includes a control unit, a central controller coupled to the control unit via a first two-conductor wireline structure, and a plurality of HVAC system components coupled to the central controller via a second two-conductor wireline structure. The central controller is configured to receive, via the first two-conductor wireline structure, control information corresponding to an enclosed space, generate control data, and transmit, via the first two-conductor wireline structure, the control data to at least one of the plurality of HVAC system components to regulate operations thereof.

A method of controlling operations of at least one of a plurality of components of a heating, ventilation, and air conditioning (HVAC) system. The method includes receiving, by a controller via a first two-conductor wireline structure, control information corresponding to an enclosed space, the control information comprising at least one of a temperature within the enclosed space and a setpoint temperature within the enclosed space and determining, by the controller, a temperature difference between the temperature within the enclosed space and the setpoint temperature within the enclosed space. Responsive to a determination that the temperature difference between the temperature within the enclosed space and the setpoint temperature within the enclosed space is greater than a predetermined acceptable range, generating, by the controller, control data and transmitting, by the controller via a second two-conductor wireline structure, the control data to the at least one of the plurality components of the HVAC system to regulate operations thereof.

DETAILED DESCRIPTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Various options have been proposed for communicating data in, for example, HVAC systems. Nevertheless, transmitting data over regular power wiring is limited to about 20 kilobits per second, which is too slow for these applications. Modern applications require approximately two to three times this rate. Wireless communication is also not a satisfactory choice due to wireless signal congestion and not having a direct line-of-sight path for control applications. As such, an improved approach to providing enhanced control data bandwidth is needed. Accordingly, exemplary embodiments provide a wireline structure and Radio Frequency (RF) wireline guided transmissions for communicating data in HVAC systems.

For purposes of the present disclosure, a wireline structure is defined as a structure having two electrical conductors that are employed to transport or conduct RF wireline guided transmissions, which provide wireline electrical voltages and currents corresponding to communications for various components, also referred to as equipment, of the HVAC system. The RF wireline guided transmissions provide control information, which is herein defined as including, for example, control commands and measurement data.

The exemplary wireline guided structure provides reliable, enhanced, and secure data transmission of the control information for the HVAC system components. Additionally, since the energy of the RF wireline guided transmission is primarily contained within the two-conductor wireline structure, spurious RF radiation is greatly reduced. Therefore, use of the RF wireline guided transmission is advantageous in that it allows higher energy levels to be applied to the two-conductor wireline structure for an acceptable level of spurious or radiated transmission noise than may typically be allowed or otherwise accommodated by a wireless transmission.

Additionally, use of a modulated RF wireline guided transmission allows and accommodates greater amounts of control information to be conveyed for the HVAC system components than would otherwise be provided by a lower frequency transmission. In addition to providing higher data capacity or transfer rates than lower frequencies, the RF wireline guided transmission may also employ modulation schemes that are generally associated with wireless transmissions.

In various embodiments, signal transmission efficiency in transporting or conveying the RF wireline guided transmission over the two-conductor wireline structure is not a primary objective. Additionally, the two-conductor wireline structures discussed herein are generally not intended to convey RF power signals.

Figure 1A:
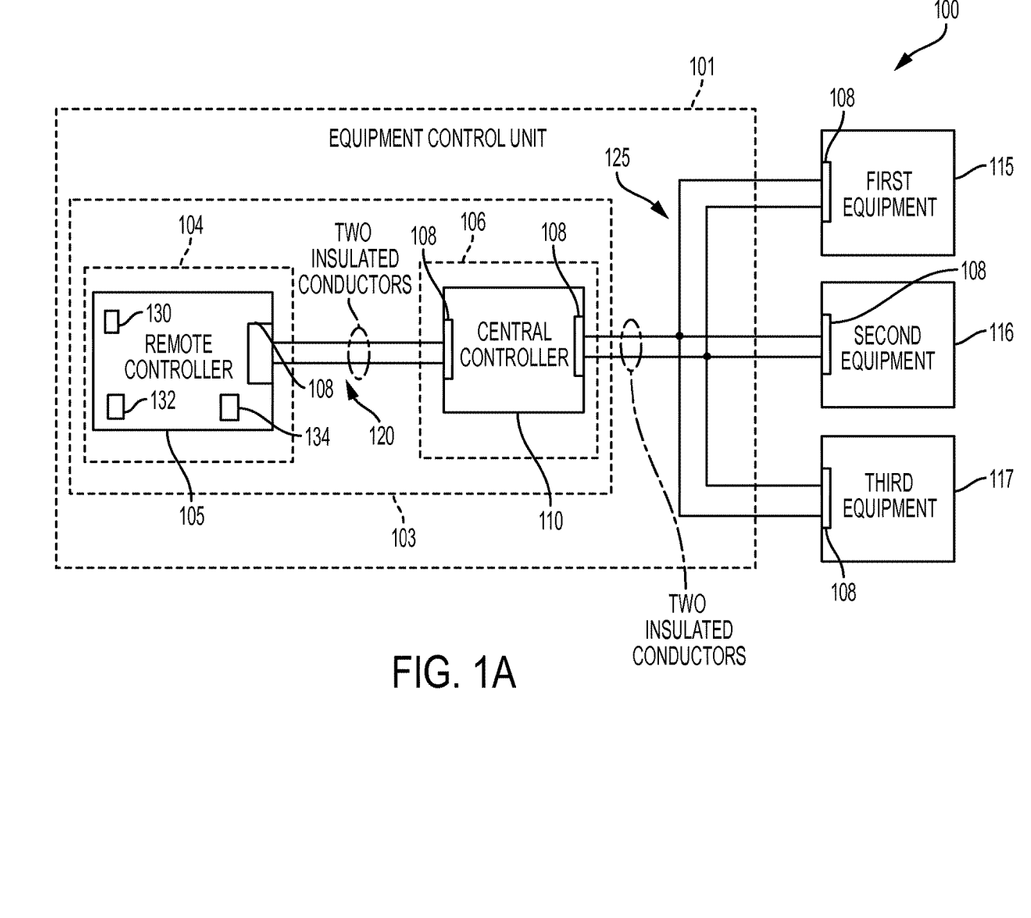
FIG. 1A illustrates an exemplary system for communicating data.

FIG. 1A illustrates an exemplary system 100 for communicating data. The system 100 includes an equipment control unit 101 and a plurality of system components 115, 116, 117. The plurality of system components 115, 116, 117 may be, for example, a compressor, a furnace, and the like. The equipment control unit 101 includes a remote controller 105, a central controller 110, a two-conductor wireline structure 120, and another two-conductor wireline structure 125. The two-conductor wireline structure 120 is coupled to the remote controller 105 and the central controller 110. The two-conductor wireline structure 125 is coupled to the central controller 110 and the plurality of system components 115, 116, 117. In a typical embodiment, the equipment control unit 101 is, for example, a control network or system that communicates control information between the plurality of system components 115, 116, 117, the remote controller 105, and the central controller 110.

The remote controller 105 is configured to provide control information for the plurality of system components 115, 116, 117. The central controller 110 is configured to control the plurality of system components 115, 116, 117 based generally on control information provided by the remote controller 105. In some embodiments, the remote controller 105 is located remotely from the central controller 110 and is connected thereto by the two-conductor wireline structure 120. For example, the remote controller 105 can be located in a first room 104 of an enclosed space 103 and the central controller 110 can be located in a second room 106 of the enclosed space 103. Alternatively, the remote controller 105 can be located outside of the enclosed space 103 and the central controller 110 can be located in the first room 104 or the second room 106 of the enclosed space 103 or even in an attic of the enclosed space 103.

In various embodiments, the remote controller 105 includes a user interface 130 such as, for example, a display that receives at least some of the control information via input from a user. In some embodiments, the user interface 130 provides additional functions such as, for example, operational, diagnostic, status message display, and a visual interface that allows at least one of an installer, the user, a support entity, and a service provider to perform actions with respect to the system 100. The remote controller 105 also includes a processor 132 and a memory 134 that cooperates to provide the control information for transmission.

In some embodiments, the processor 132 and the memory 134 cooperate with the user interface 130 to receive and generate the control information. The processor 132, the memory 134, and the user interface 130 can be conventional components of the remote controller 105 and provide functionality in addition to providing the control information for transmission. In some embodiments, the processor 132 may be a microprocessor, controller, or any other suitable computing device, resource, or combination of hardware, software and/or encoded logic operable to execute, either alone or in conjunction with other components. Such functionality may include providing various features discussed herein. In particular embodiments, the processor 132 may include hardware for executing instructions. As an example and not by way of limitation, to execute instructions, the processor 132 may retrieve (or fetch) instructions from an internal register, an internal cache, a storage device; decode and execute them; and then write one or more results to the internal register, the internal cache, or the storage device.

In some embodiments, the memory 134 may be any form of volatile or non-volatile memory including, without limitation, magnetic media, optical media, random access memory (RAM), read-only memory (ROM), flash memory, removable media, or any other suitable local or remote memory component or components. In particular embodiments, the memory 134 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. The memory 134 may store any suitable data or information, including software embedded in a computer readable medium, and/or encoded logic incorporated in hardware or otherwise stored (e.g., firmware). In particular embodiments, the memory 134 may include main memory for storing instructions for the processor 132 to execute or data for the processor 132 to operate on.

The two-conductor wireline structure 120 is configured to transport the RF wireline guided transmission containing the control information for the plurality of system components 115, 116, 117. Additionally, the two-conductor wireline structure 120 may provide a power voltage to the remote controller 105. In some embodiments, transmission of the control information may be on a response basis as initiated by the remote controller 105. In other embodiments, transmission of the control information may be on a request basis as initiated by the central controller 110. In either case, the RF wireline guided transmission is employed on the two-conductor wireline structure 120. In some embodiments, the RF wireline guided transmissions between the remote controller 105 and the central controller 110 may be accomplished in, for example, a half-duplex transmission mode or a full-duplex transmission mode.

The remote controller 105, the central controller 110, and the plurality of system components 115, 116, 117 each include at least one RF wireline communicator 108. The RF wireline communicator 108 is configured to generate the RF wireline guided transmission to send over the two-conductor wireline structures 120, 125. The RF wireline communicator 108 is further configured to receive the control information and generate the RF wireline guided transmission based thereon. The RF wireline communicator 108 includes circuitry, software, or a combination thereof configured to receive an input, such as the control information, generate an RF signal based thereon, and transmit the generated RF signal on the two-conductor wireline structure 120. In a typical embodiment, the RF wireline communicator 108 is, for example, an integrated RF transceiver that receives the control information from at least one of the processor 132, the memory 134, and the user interface 130, and generates the RF wireline guided transmission. The RF wireline communicator 108 can include, for example, a processor, an RF transmitter and receiver, a digital to analog converter and an analog to digital converter. In one embodiment the RF wireline communicator 108 employs a MKW01Z128 wireless transceiver available from Freescale Semiconductor of Austin, Tex.

In some embodiments, the two-conductor wireline structure 120 generally consists of two insulated conductive wires that convey the RF wireline guided transmission. In particular, the two-conductor wireline structure 120 may employ a twisted pair of insulated conductive wires. Generally, the two-conductor wireline structure 120 may consist of any two electrical conductors that will transport an RF transmission containing control information over a required distance while maintaining a desired spurious, radiated transmission noise requirement for the RF transmission.

The two-conductor wireline structure 125 may typically be more complex, than the two-conductor wireline structure 120, if it accommodates more than one system component, as illustrated in FIG. 1A. The two-conductor wireline structure 125 is a two-conductor wireline "bus" structure that conveys the RF wireline guided transmission to each of the plurality of system components 115, 116, 117. In some embodiments, the RF wireline guided transmission may be the same one received from the remote controller 105 that is forwarded by the central controller 110. In other embodiments, the RF wireline transmission may be one generated by the central controller 110 that is either based on the control information from the remote controller 105 or information that has been originated by the central controller 110. The RF wireline guided transmission between the central controller 110 and the plurality of system components 115, 116, 117 may be accomplished in, for example, a half-duplex or a full-duplex transmission mode. In another embodiment, a more conventional data bus (not shown) may be alternately employed to provide the control information to the plurality of system components 115, 116, 117.

In a typical embodiment, the data bus may include any combination of hardware, software embedded in a computer readable medium, and/or encoded logic incorporated in hardware or otherwise stored (e.g., firmware) to couple the plurality of system components 115, 116, 117 to each other. As an example and not by way of limitation, the data bus may include an Accelerated Graphics Port (AGP) or other graphics bus, a controller area network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a Universal Serial Bus (USB), a PCI-Express (PCI-X) bus, a serial advanced technology attachment (SATA) bus, a Video Electronics Standards Association local (VLB) bus, RS-485, Ethernet, or any other suitable bus or a combination of two or more of these. The data bus may include any number, type, and/or configuration of buses, where appropriate. In particular embodiments, one or more buses (which may each include an address bus and a data bus) may couple the central controller 110 to the plurality of system components 115, 116, 117. In other embodiments, the connections between the plurality of system components 115, 116, may be wired. For example, conventional cable and contacts may be used to couple the central controller 110 to the plurality of system components 115, 116, 117.

In some embodiments, the remote controller 105 may be employed to monitor or sense certain parameters corresponding to an environment remote from the central controller 110 and the plurality of system components 115, 116, 117. In other embodiments, the remote controller 105 may be employed to accept only manually entered information to provide the control information. Additionally, the remote controller 105 may monitor or sense certain parameters and require other manually entered data or information.

In a typical embodiment, the RF wireline guided transmissions operates in the Ultra high frequency (UHF) range and includes a carrier signal having modulation that corresponds to the control information. In some embodiments, the modulation may be selected from the group comprising, for example, on-off keying, minimum-shift keying, frequency-shift keying, Gaussian frequency-shift keying, and the like. In other embodiments, other types of modulation may be employed as appropriate to other applications. Additionally, license-free industrial, scientific and medical (ISM) frequency bands in the UHF range may be employed.

Figure 1B:
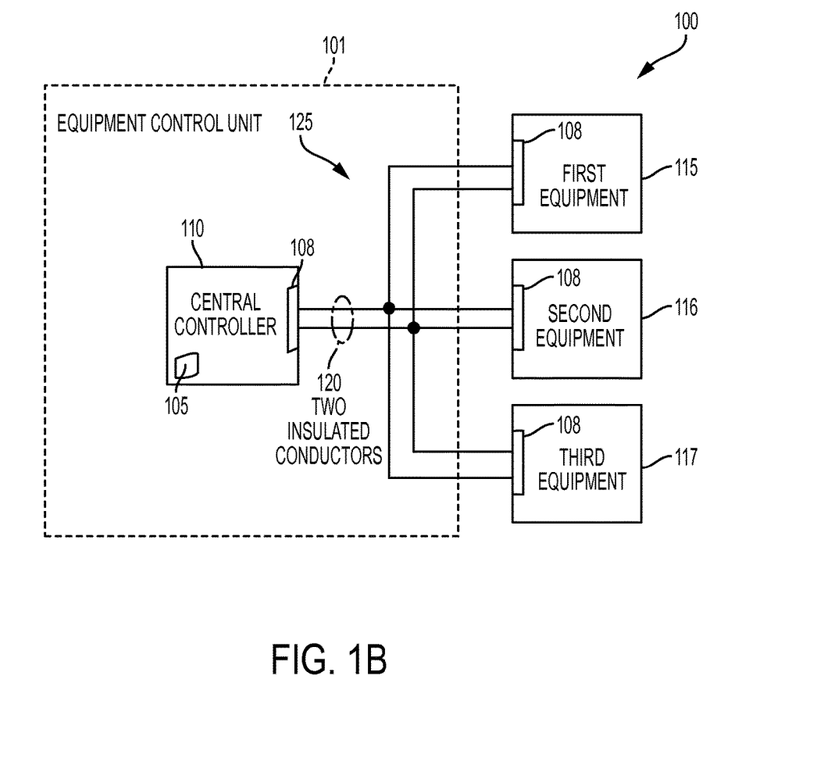
FIG. 1B illustrates an exemplary system for communicating data in accordance with an alternate embodiment.

FIG. 1B illustrates an exemplary system 100 for communicating data in accordance with an alternate embodiment. In the embodiment illustrated in FIG. 1B, the remote controller 105 is integrated into the central controller 110. The central controller 110 incorporating the remote controller 105 is configured to generate control information and control the plurality of system components 115, 116, 117 based generally on the control information in similar fashion as discussed above relative to FIG. 1A.

Figure 2A:
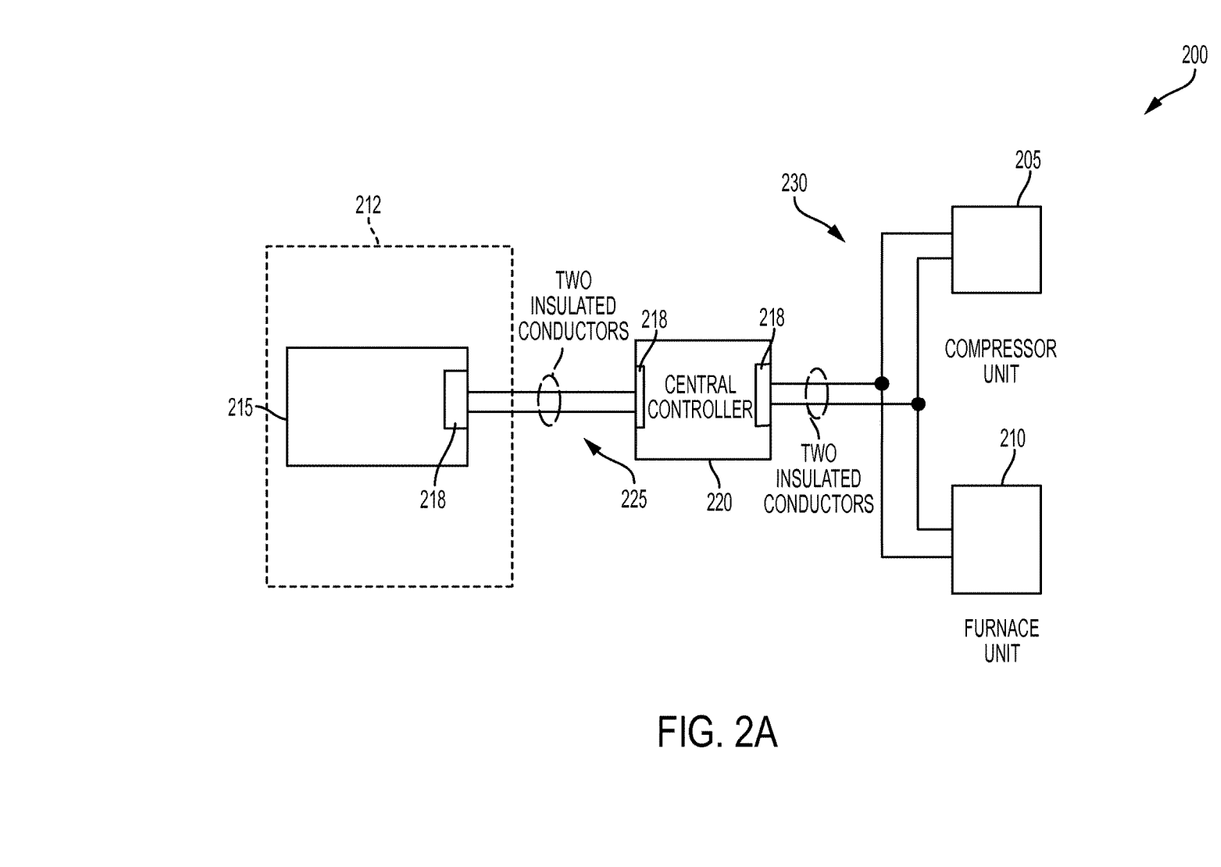
FIG. 2A illustrates an exemplary HVAC system for communicating data.

FIG. 2A illustrates an exemplary HVAC system 200 for communicating data. The HVAC system 200 includes a compressor unit 205, a furnace unit 210, and an enclosed space 212. The HVAC system 200 also includes a control unit 215, a central controller 220, a two-conductor wireline structure 225, and another two-conductor wireline structure 230. In some embodiments, the control unit 215 may be, for example, a thermostat of the HVAC system 200.

The compressor unit 205 is configured to provide cooling for the enclosed space 212 and the furnace unit 210 is configured to provide heating for the enclosed space 212. The thermostat 215 provides control information corresponding to the enclosed space 212 and the central controller 220 controls operation of the compressor and furnace units 205, 210. In one embodiment, the thermostat 215 is a user interface between the user and the HVAC system 200. As such, the thermostat 215 can include a communications interface 213 configured to communicate information between the user and the HVAC system 200. The communications interface 213 can include, for example, a display, buttons, a speaker, a microphone, or another device configured to receive or provide information between the user and the HVAC system 200.

Additionally, the thermostat 215 can include a processor 214 and a memory 216 that cooperate to provide the control information for transmission. The processor 214 and the memory 216 can be conventional components of the thermostat 215 and provide functionality in addition to providing the control information for transmission. The processor 214 and the memory 216 can also cooperate with the communications interface 213 to provide the control information. In a typical embodiment, the processor 214 may be a microprocessor, controller, or any other suitable computing device, resource, or combination of hardware, software and/or encoded logic operable to execute, either alone or in conjunction with other components. Such functionality may include providing various features discussed herein. In particular embodiments, the processor 214 may include hardware for executing instructions. As an example and not by way of limitation, to execute instructions, the processor 214 may retrieve (or fetch) instructions from an internal register, an internal cache, a storage device; decode and execute them; and then write one or more results to the internal register, the internal cache, or the storage device. In some embodiments, the memory 216 may be any form of volatile or non-volatile memory including, without limitation, magnetic media, optical media, random access memory (RAM), read-only memory (ROM), flash memory, removable media, or any other suitable local or remote memory component or components. In particular embodiments, the memory 216 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. The memory 216 may store any suitable data or information, including software embedded in a computer readable medium, and/or encoded logic incorporated in hardware or otherwise stored (e.g., firmware). In particular embodiments, the memory 216 may include main memory for storing instructions for the processor 214 to execute or data for the processor 214 to operate on.

As noted earlier, the control information generally includes control commands and measurement data or information that is pertinent to the enclosed space 212, in this case. Additionally, the control information may be directed or impacted by manual or wireless input to the thermostat 215. In one embodiment, the control information includes temperature setpoints, humidity set points, and environmental data of the air space 212, such as the dry-bulb temperature and the relative humidity. In some embodiments, the control information also includes operating data of equipment, such as motor speed.

The thermostat 215 and the central controller 220 each includes at least one RF wireline communicator 218 that is configured to generate a RF wireline guided transmission to send over the two-conductor wireline structures 225, 230. In one embodiment, the RF wireline communicator 218 receives the control information and generates the RF wireline guided transmission based thereon. The RF wireline communicator 218 includes circuitry, software, or a combination thereof configured to receive an input, such as the control information, generate an RF signal based thereon, and transmit the generated RF signal on the two-conductor wireline structure 225. The RF wireline communicator 218 can be an integrated RF transceiver that receives the control information, such as from the processor, memory, or user interface, and generates the RF wireline guided transmission based thereon. In one embodiment, the RF wireline communicator 218 employs, for example, the Freescale MKW01Z128 wireless transceiver.

The two-conductor wireline structure 225 is coupled to the thermostat 215 and the central controller 220 and transports the RF wireline guided transmission containing the control information for at least one of the compressor unit 205 and the furnace unit 210. The two-conductor wireline structure 225 can be coupled to the thermostat 215 and the central controller 220 via RF wireline communicators, such as the RF wireline communicator 218. In some embodiments, the RF wireline guided transmission includes a carrier signal having modulation that corresponds to the control information. In one embodiment, the modulation includes, for example, on-off keying, minimum-shift keying, frequency-shift keying and Gaussian frequency-shift keying. In other embodiments, other types of modulation may be employed.

Generally, the two-conductor wireline structure 225 includes a pair of insulated conductive wires that transports RF wireline guided transmissions between the thermostat 215 and the central controller 220. In one embodiment, the pair of insulated conductive wires is a twisted pair of insulated conductive wires. Additionally, the two-conductor wireline structure 225 may provide a power voltage (e.g., a DC or 60 Hertz AC voltage) to the thermostat 215 from the central controller 220. This power voltage may be provided for operation of the thermostat 215.

In this embodiment, the two-conductor wireline structure 230 is coupled to the central controller 220 and the compressor and furnace units 205, 210 and transports either the RF wireline guided transmission from the thermostat 215 or another RF wireline guided transmission generated by the central controller 220 for control of at least one of the compressor unit 205 and the furnace unit 210. As noted in FIG. 1A, the two-conductor wireline structure 230 is also a two-conductor wireline "bus" structure, although a single pair of insulated conductors may be employed as appropriate for other embodiments.

In some embodiments, the RF wireline guided transmission may be transported over the two-conductor wireline structure 225 employing, for example, a half-duplex transmission or a full-duplex transmission between the thermostat 215 and the central controller 220. These communications accommodate an interchange where specific control information or requirements may be requested and responded to between the thermostat 215 and the central controller 220. Similarly, the RF wireline guided transmission may be transported over the two-conductor wireline structure 230 employing, for example, a half-duplex transmission or a full-duplex transmission. In some embodiments, control commands are transported from the central controller 220 to at least one of the compressor unit 205 and the furnace unit 210, and operating data is conveyed from at least one of the compressor unit 205 and the furnace unit 210 to the central controller 220.

In one embodiment of the two-conductor wireline structure 230, an RF wireline guided transmission containing the control information is transported over first and second sections of pressurized conductive tubing (e.g., copper tubing sections containing coolant for the compressor unit 205). In another embodiment, a more conventional digital or analog bus (not shown) may be alternately employed to provide control information to the compressor unit 205 or the furnace unit 210.

In general, a higher RF operating range for RF wireline guided transmissions on the two-conductor wireline structures 225, 230 provides a greater capacity for control information to be achieved. In contrast, a lower RF operating range for the RF guided transmissions may provide lower losses associated with attenuation and spurious RF radiation. In some embodiments, the RF wireline guided transmissions operate in the Ultra high frequency (UHF) range of approximately 300 MHz to 3 GHz and provide control information rates of approximately 600 kilobaud over two-conductor wireline structures having up to 400 feet of 18 gauge wire. Additionally, the license-free industrial, scientific and medical (ISM) frequency bands that operate in the UHF range may be advantageously employed.

Figure 2B:
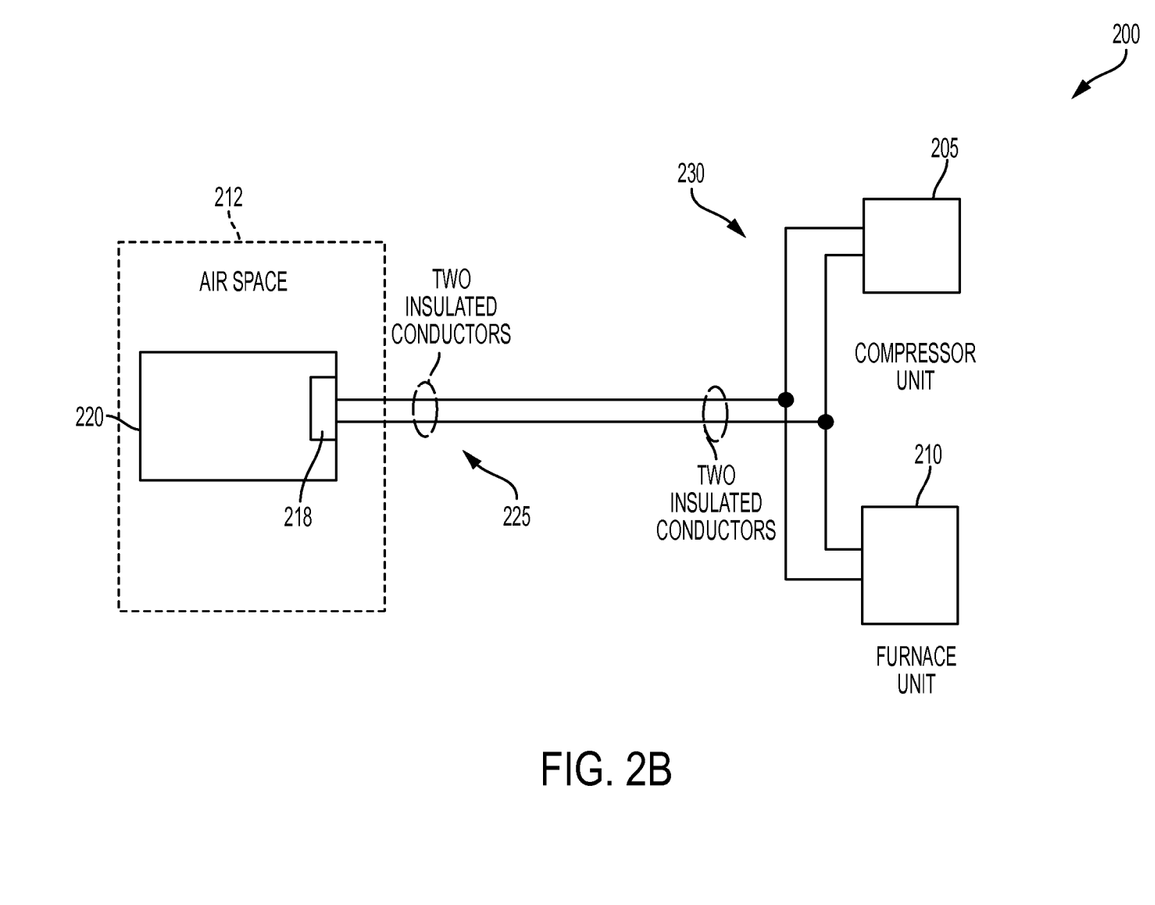
FIG. 2B illustrates an exemplary HVAC system for communicating data in accordance with an alternate embodiment.

FIG. 2B illustrates an exemplary HVAC system 200 for communicating data in accordance with an alternate embodiment. In the embodiment illustrated in FIG. 2B, the central controller 220 is configured to perform the functions of the control unit 215 illustrated in FIG. 2A. In particular, the central controller 220 generates control information and controls operation of at least one of the compressor unit 205 and the furnace unit 210 based generally on the control information in similar fashion as discussed above relative to FIG. 2A.

Figure 3:
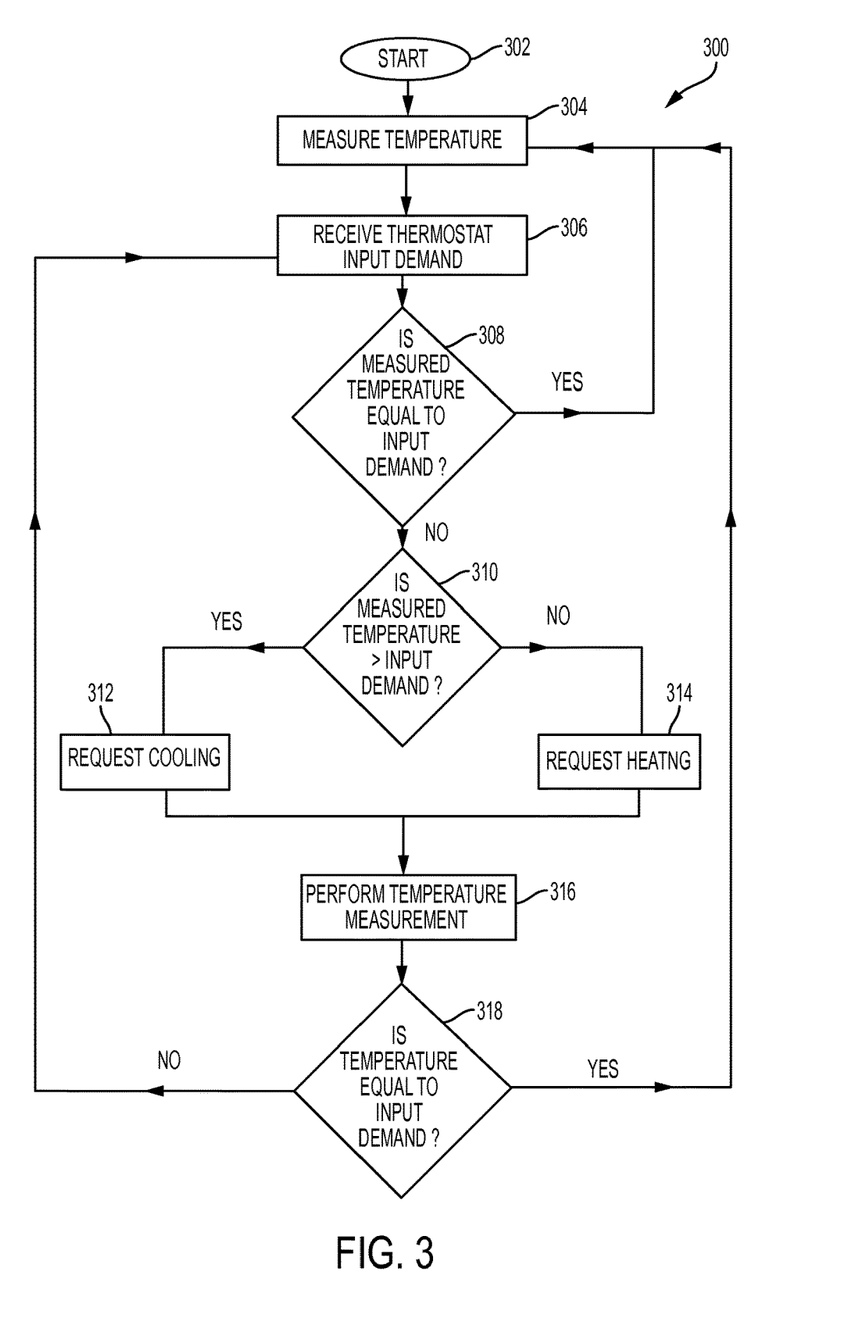
FIG. 3 is a flow chart illustrating a process for controlling operations of HVAC system components.

FIG. 3 is a flow chart illustrating a process 300 for controlling operations of the HVAC system 200. For illustrative purposes, the process 300 will be described relative to FIGS. 2A-2B. The process 300 starts at step 302. At step 304, current temperature of the enclosed space 212 is measured. At step 306, a thermostat demand input is received. The thermostat demand input may be a demand for the HVAC system 200 to condition the air within the enclosed space 212 to a setpoint temperature. For purpose of this patent application, a setpoint temperature refers to a target temperature setting of the HVAC system 200 as set by the user or automatically based on a pre-defined schedule. For purpose of this patent application, a thermostat demand may be a demand for the HVAC system 200 to condition the air. For example, the thermostat demand may be a cooling demand or a heating demand. At step 308, it is determined if the measured temperature (step 304) is equal to or is within an acceptable range such as, for example, 0.1 to 0.5 degrees of the thermostat demand input (step 306). The acceptable range can be based on various factors such as, for example, a type of the HVAC system, a model of the HVAC system, and the like. If it is determined at step 308 that the measured temperature (step 304) is equal to the thermostat demand input (step 306) or is within the acceptable range of the thermostat demand input (step 306), the process 300 proceeds to step 304.

However, if it is determined at step 308 that the measured temperature (step 304) is not equal to the thermostat demand input (step 306) or is not within the acceptable range of the thermostat demand input (step 306), the process 300 proceeds to step 310. At step 310, it is determined if the measured temperature (step 304) is greater than the thermostat demand input (step 306). If it is determined at step 310 that the measured temperature (step 304) is greater than the thermostat demand input (step 306), the process 300 proceeds to step 312. At step 312, control information for cooling the enclosed space 212 is forwarded to the compressor unit 205. In a typical embodiment, the control information is conveyed via the RF wireline guided transmission that is transported over the two-conductor wireline structure 225, 230.

However, if it is determined at step 310 that the measured temperature (step 304) is lower than the thermostat demand input (step 306), the process 300 proceeds to step 314. At step 314, control information for heating the enclosed space 212 is forwarded to the furnace unit 210. In a typical embodiment, the control information is conveyed via the RF wireline guided transmission that is transported over the two-conductor wireline structure 225, 230. From steps 312 and 314, the process 300 proceeds to step 316. At step 316, current temperature of the enclosed space 212 is measured again. At step 318, it is determined if the measured temperature (step 316) is equal to the thermostat demand input (step 306) or is within the acceptable range of the thermostat demand input (step 306). If it is determined at step 318 that the measured temperature (step 316) is not equal to the thermostat demand input (step 306) and is not within the acceptable range of the thermostat demand input of the thermostat demand input (step 306), the process 300 proceeds to step 306. However, it is determined at step 318 that the measured temperature (step 316) is equal to the thermostat demand input (step 306) or is within the acceptable range of the thermostat demand input (step 306), the process 300 proceeds to step 304.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of the processor 320, one or more portions of the system memory, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A heating, ventilation, and air conditioning (HVAC) system comprising:
    a control unit;
    a central controller coupled to the control unit via a first two-conductor wireline structure;
    a plurality of HVAC system components coupled to the central controller via a second two-conductor wireline structure;
    wherein the central controller is configured to:
        receive, via the first two-conductor wireline structure, control information corresponding to an enclosed space;
        generate control data; and
        transmit, via the second two-conductor wireline structure, the control data to at least one of the plurality of HVAC system components to regulate operations thereof, wherein the second two-conductor wireline structure is configured to transport a Radio Frequency (RF) guided wireline transmission containing the control data between the central controller and the plurality of HVAC system components; and
    wherein the first two-conductor wireline structure is configured to transport the RF guided wireline transmission containing the control information between the control unit and the central controller of the HVAC system;
    wherein the control unit, the plurality of HVAC system components, and the central controller each comprise at least one RF wireline communicator; and
    wherein the at least one RF wireline communicator is configured to generate the RF guided wireline transmission.

2. The system of claim 1, wherein the control information comprises at least one of current temperature within the enclosed space, current humidity within the enclosed space, a setpoint temperature within the enclosed space, and a setpoint humidity within the enclosed space.

3. The system of claim 1, wherein the first two-conductor wireline structure comprises a twisted pair of insulated conductive wires.

4. The system of claim 1, wherein transmission of the control data is accomplished in at least one of a half-duplex transmission mode and a full-duplex transmission mode.

5. The system of claim 1, wherein the at least one RF wireline communicator comprises an RF transceiver.

6. The system of claim 1, wherein the plurality of HVAC system components comprise at least one of a compressor and a furnace.

7. The system of claim 1, wherein the first two-conductor wireline structure is configured to provide a power voltage to the control unit.

8. The system of claim 1, wherein the control unit comprises a thermostat.

9. The system of claim 1, wherein the control unit is located in a location remote from the central controller.

10. The system of claim 1, wherein the control unit is incorporated within the central controller.

11. The system of claim 1, wherein the second two-conductor wireline structure comprises a bus structure.

12. The system of claim 1, wherein the RF guided wireline transmission operates in Ultra high frequency (UHF) range.

13. A method of controlling operations of at least one of a plurality of components of a heating, ventilation, and air conditioning (HVAC) system, the method comprising:
    receiving, by a controller via a first two-conductor wireline structure, control information corresponding to an enclosed space, the control information comprising at least one of a temperature within the enclosed space and a setpoint temperature within the enclosed space;
    determining, by the controller, a temperature difference between the temperature within the enclosed space and the setpoint temperature within the enclosed space;
    responsive to a determination that the temperature difference between the temperature within the enclosed space and the setpoint temperature within the enclosed space is greater than a predetermined acceptable range, generating, by the controller, control data;
    transmitting, by the controller via a second two-conductor wireline structure, the control data to the at least one of the plurality of components of the HVAC system to regulate operations thereof, wherein the second two-conductor wireline structure is configured to transport a Radio Frequency (RF) guided wireline transmission containing the control data;
    wherein the first two-conductor wireline structure is configured to transport the RF guided wireline transmission containing the control information;
    wherein the controller and the plurality of components of the HVAC each comprise at least one RF wireline communicator; and
    wherein the at least one RF wireline communicator is configured to generate the RF guided wireline transmission.

14. The method of claim 13, wherein the predetermined acceptable range is between 0.1° F. to 0.5° F. of the setpoint temperature.

15. The method of claim 13, further comprising:
    responsive to a determination that the temperature difference between the temperature within the enclosed space and the setpoint temperature within the enclosed space is not greater than the predetermined acceptable range, the control data is not transmitted.

16. The method of claim 13, wherein the first two-conductor wireline structure comprises a twisted pair of insulated conductive wires.

17. The method of claim 13, wherein the transmitting is accomplished in at least one of a half-duplex transmission mode and a full-duplex transmission mode.

18. The method of claim 13, wherein the controller comprises a thermostat.

19. The method of claim 13, wherein the second two-conductor wireline structure comprises a bus structure.

20. The method of claim 13, wherein the RF guided wireline transmission operates in Ultra high frequency (UHF) range.

* * * * *